US010475130B2

(12) United States Patent
Houseworth et al.

(10) Patent No.: US 10,475,130 B2
(45) Date of Patent: Nov. 12, 2019

(54) METHOD, SYSTEM, AND COMPUTER PROGRAM FOR PREDICTING TAX LIABILITIES ASSOCIATED WITH REPORTABLE INCOME ON A 1099 FORM

(71) Applicant: HRB Tax Group, Inc., Kansas City, MO (US)

(72) Inventors: Jason Houseworth, Olathe, KS (US); Giao T. Carrico, Leawood, KS (US); Keith Ehrhard, Lee's Summit, MO (US); Michael S. McWilliams, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 1257 days.

(21) Appl. No.: 13/753,194

(22) Filed: Jan. 29, 2013

(65) Prior Publication Data

US 2013/0198047 A1 Aug. 1, 2013

Related U.S. Application Data

(60) Provisional application No. 61/592,246, filed on Jan. 30, 2012.

(51) Int. Cl.
*G06Q 40/00* (2012.01)

(52) U.S. Cl.
CPC .................................. *G06Q 40/123* (2013.12)

(58) Field of Classification Search
CPC ...... G06Q 40/103; G06Q 40/02; G06Q 40/10; G06Q 40/123; G06Q 20/207; G06Q 10/10

(Continued)

(56) References Cited

U.S. PATENT DOCUMENTS 7,257,553 B1 8/2007 Baker
7,539,635 B1 * 5/2009 Peak ...................... G06Q 10/00 705/31

(Continued)

FOREIGN PATENT DOCUMENTS

JP 2003-178195 A 6/2003
JP 2004-355071 A 12/2004

(Continued)

OTHER PUBLICATIONS

Magazine, The Controller's Report, Form 1099 Reporting Requirements Have Cost Implications, Dec. 2010, Institute of Management & Administration, Issue 10-12, 3 pages. (Year: 2010).*

(Continued)

*Primary Examiner* — Benjamin S Brindley
(74) *Attorney, Agent, or Firm* — Erise IP, P.A.

(57) ABSTRACT

A method, a system, and a computer program for predicting an impact of a tax event, such as reportable income on a 1099 form, on a user's tax liabilities at any intermediate time during a current tax year based on a comparison of known and predicted user information related to the user and the user's taxes, tax event information, and a tax deduction database of tax deductions, credits, and eligibility rules. The computer program and method for predicting the impact of the tax event comprise acquiring information about the user from a user profile, acquiring information about the tax event, comparing the user information and the tax event information with requirements for tax deductions and credits offered by a taxing authority, and identifying deductions or credits having requirements related to the user information and the tax event information.

19 Claims, 5 Drawing Sheets

400

402 ACQUIRE KNOWN USER INFORMATION RELATED TO THE USER AND THE USER'S TAXES

404 PREDICT AT LEAST SOME USER INFORMATION RELATED TO THE USER AND THE USER'S TAXES FOR A REMAINDER OF THE CURRENT TAX YEAR BASED AT LEAST PARTIALLY ON THE KNOWN USER INFORMATION

406 ACQUIRE REPORTABLE INCOME ON A 1099 FORM TO DATE IN THE CURRENT TAX YEAR ("1099 REPORTABLE INCOME TO DATE")

408 COMPARE THE KNOWN USER INFORMATION, THE PREDICTED USER INFORMATION, AND THE 1099 REPORTABLE INCOME TO DATE WITH REQUIREMENTS FOR AT LEAST ONE OF TAX DEDUCTIONS AND TAX CREDITS OFFERED BY TAXING AUTHORITY

410 IDENTIFY DEDUCTIONS OR CREDITS HAVING REQUIREMENTS RELATED TO THE KNOWN USER INFORMATION, THE PREDICTED USER INFORMATION, AND THE 1099 REPORTABLE INCOME TO DATE

412 PREDICT THE IMPACT OF THE 1099 REPORTABLE INCOME TO DATE ON THE USER'S TAX LIABILITY BASED ON THE KNOWN USER INFORMATION, THE PREDICTED USER INFORMATION, THE 1099 REPORTABLE INCOME TO DATE, AND THE REQUIREMENTS FOR AT LEAST ONE OF TAX DEDUCTIONS AND TAX CREDITS FOR THE CURRENT TAX YEAR

(58) Field of Classification Search
USPC .......................................................... 705/31
See application file for complete search history.

(56) References Cited

U.S. PATENT DOCUMENTS

| | | | | |
|---|---|---|---|---|
| 7,693,769 | B1 * | 4/2010 | Burlison | G06Q 40/02 705/36 R |
| 7,742,958 | B1 * | 6/2010 | Leek et al. | 705/31 |
| 8,407,113 | B1 * | 3/2013 | Eftekhari | G06Q 40/123 705/31 |
| 8,554,645 | B1 * | 10/2013 | Hwu | G06Q 10/06 705/30 |
| 8,589,262 | B1 * | 11/2013 | Wang | G06F 17/27 382/137 |
| 8,694,395 | B2 | 4/2014 | Houseworth et al. | |
| 8,706,580 | B2 | 4/2014 | Houseworth et al. | |
| 2004/0078307 | A1 * | 4/2004 | Carver | G06Q 40/02 705/31 |
| 2010/0070394 | A1 * | 3/2010 | Wyle | G06F 17/243 705/31 |
| 2010/0076876 | A1 * | 3/2010 | Brady | G06Q 40/00 705/31 |
| 2010/0185561 | A1 * | 7/2010 | Torre | G06Q 40/00 705/36 R |
| 2011/0016062 | A1 * | 1/2011 | Olsen | G06Q 40/10 705/36 T |
| 2011/0145112 | A1 * | 6/2011 | Abeles | G06Q 20/10 705/31 |
| 2011/0288972 | A1 * | 11/2011 | Brady | G06Q 40/00 705/31 |
| 2012/0053965 | A1 * | 3/2012 | Hellman | G06Q 40/00 705/4 |
| 2014/0108213 | A1 | 4/2014 | Houseworth et al. | |

FOREIGN PATENT DOCUMENTS

| | | | |
|---|---|---|---|
| KR | 10-2001-0108242 | A | 12/2001 |
| WO | 2011/139515 | A2 | 11/2011 |

OTHER PUBLICATIONS

File History of U.S. Appl. No. 12/767,637, filed Apr. 26, 2010, now U.S. Pat. No. 8,706,580, issued Apr. 22, 2014, entitled Method, System, and Computer Program for Predicting Tax Liabilites and Benefits; Assignee: HRB Tax Group, Inc.

File History of U.S. Appl. No. 12/771,064, filed Apr. 30, 2010, now U.S. Pat. No. 8,694,395, issued Apr. 8, 2014, entitled Method, System, and Computer Program for Predicting Tax Liabilities and Benefits; Assignee: HRB Tax Group, Inc.

File History of U.S. Appl. No. 14/134,846, filed Dec. 19, 2013, entitled Method, System, and Computer Program for Predicting Tax Liabilities and Benefits; Assignee: HRB Tax Group, Inc.

International Search Report dated Dec. 9, 2011; International Application No. PCT/US2011/032493; International Filing Date: Apr. 14, 2011; Applicant: HRB Tax Group, Inc. et al.

Written Opinion of the International Searching Authority dated Dec. 9, 2011; International Application No. PCT/US2011/032493; International Filing Date: Apr. 14, 2011; Applicant: HRB Tax Group, Inc. et al.

* cited by examiner

METHOD, SYSTEM, AND COMPUTER PROGRAM FOR PREDICTING TAX LIABILITIES ASSOCIATED WITH REPORTABLE INCOME ON A 1099 FORM

RELATED APPLICATIONS

This patent application is a non-provisional application and claims priority benefit, with regard to all common subject matter, of earlier-filed U.S. Provisional Patent Application No. 61/592,246, filed Jan. 30, 2012, and entitled "METHOD, SYSTEM, AND COMPUTER PROGRAM FOR PREDICTING TAX LIABILITIES ASSOCIATED WITH REPORTABLE INCOME ON A 1099 FORM." The identified earlier-filed provisional patent application is hereby incorporated by reference in its entirety into the present application.

BACKGROUND

1. Field

Embodiments of the present invention relate to a method, a system, and a computer program for predicting an impact of a tax event on a user's tax liabilities at any intermediate time during a current tax year based on a comparison of known user information, predicted user information, tax event information, and tax deductions, credits, and eligibility rules for a particular deduction. More particularly, embodiments of the present invention predict the impact on the user's tax liability of tax events that include income reported on a 1099 form.

2. Related Art

Tax preparation software is currently available for use in determining a user's tax liability for the previous year by asking the user questions regarding their gross annual income, purchases, taxes paid throughout the year, and other financial actions taken by the user. Although the user may guess their total deductions and tax liability for the current tax year based on the previous year's tax return, such a method is unreliable due to possible changes in the user's income, changes in the user's purchases, changes in the user's life events, or changes in tax laws compared with the previous tax year. Accordingly, there is a need for a method, a system, and a computer program that assists the user with computing and predicting, at an intermediate time in the current tax year, the tax impact of a tax event, such as income reported on a 1099 form, purchases, or other actions.

In addition to the problems stemming from knowing the tax impact of the tax event at an intermediate time in the current tax year, there is no method, system, or computer program for assisting the user in determining the impact of the tax event, such as income reported on a 1099 form or purchases. Accordingly, there is a need for a method, system, and computer program for assisting a user in determining how a particular tax event may affect their tax bill for the current year prior to or in conjunction with income reported on a 1099 form.

Furthermore, as users go about their daily activities, users are generally not aware of tax events they could make or actions they could take to decrease tax liabilities or otherwise maximize tax benefits available to them. For example, a combination of factors may need to be considered to determine if a user is eligible for a particular deduction or credit, such as a user's occupation, income, age, number of dependents, location, and medical expenses. It is possible that a user may be aware of a few tax deductions available to them, but the user is seldom aware of all the combinations of factors that could affect their deduction eligibility. Thus, users may unknowingly miss opportunities to make purchases or take actions that could reduce their tax liability. In turn, users may also unknowingly take actions that could increase their tax liability. Accordingly, there is a need for a method, system, and computer program that will educate a user on potential tax benefits or potential tax consequences of tax events based on known information about the user.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

The present invention is a method, system, and computer program for broadly determining the tax liabilities or benefits of a tax event, such as income reported on a 1099 form. Embodiments of the present invention broadly comprise acquiring both known and predicted user information from a user profile, acquiring information regarding the income reported on a 1099 form, comparing the user information and the information regarding the income reported on a 1099 form with requirements for tax deductions and credits offered by a government entity or taxing authority, and identifying deductions or credits that have requirements related to or corresponding to the user and information regarding the income reported on a 1099 form. In embodiments of the present invention, the user information may comprise the user's occupation, the user's past tax returns, the user's city, county, state, and country of residence, the user's marital status, information regarding the user's spouse, the user's past income, the user's predicted income, the user's past tax bracket, the user's current tax bracket, and other information germane to determining tax benefits and liabilities based on the user's information. The information regarding the income reported on a 1099 form, may include, without limitation, earned income interest, sale of securities, dividends received from stocks, etc.

Additional embodiments of the present invention broadly comprise projecting an end of year 1099 form reportable income for a user. In embodiments of the present invention, a user interface is presented to a user's user device. Information regarding the user's 1099 reportable income to date is acquired. Using the acquired 1099 reportable income to date and additional 1099 projection information, embodiments of the present invention project an end of year 1099 reportable income. Such end of year 1099 reportable income is thereafter presented to the user via the user interface on the user's user device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
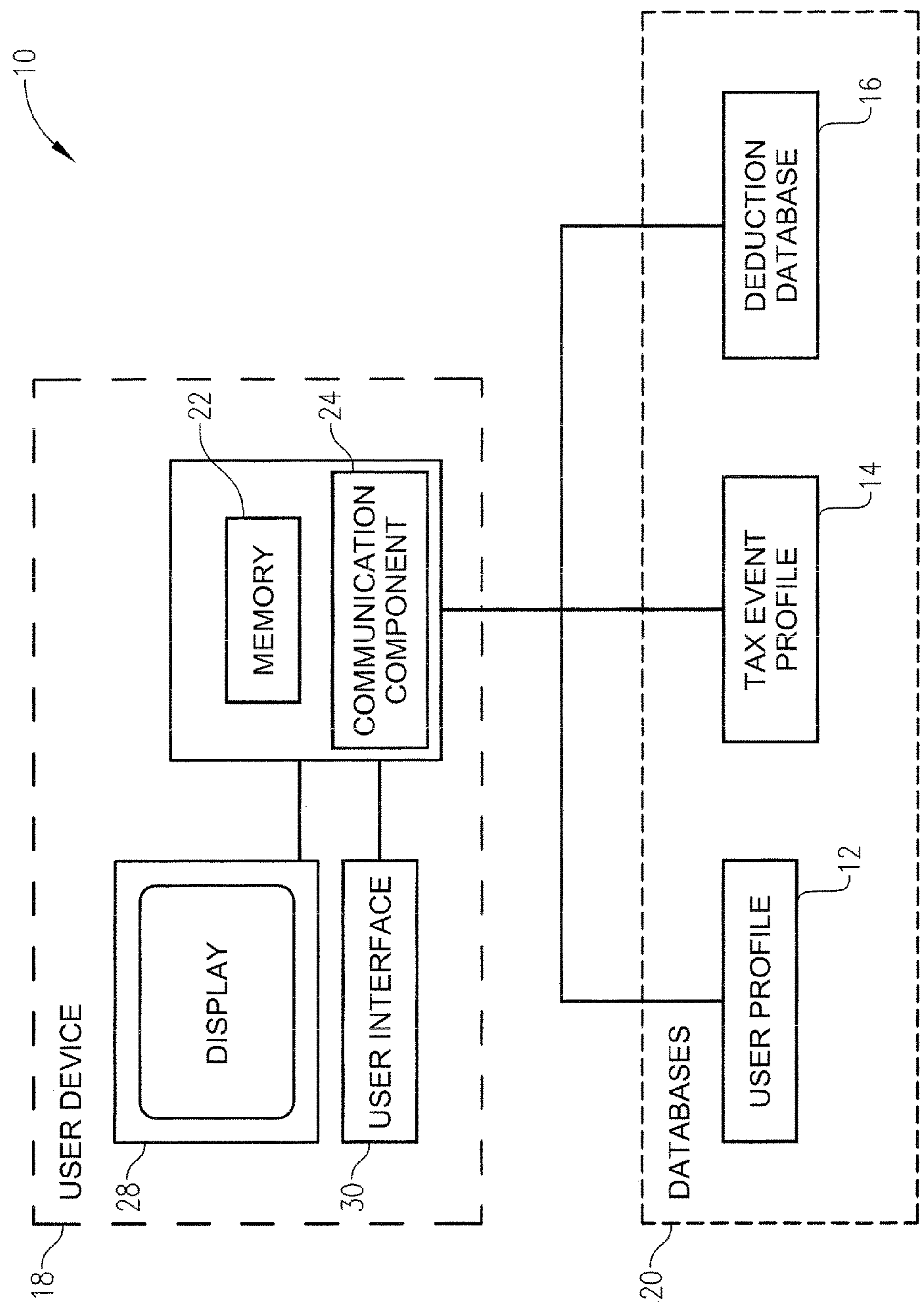
FIG. 1 is a system for determining tax benefits of a purchase constructed according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention include a method, a system, and a computer program for predicting, at an intermediate time in a current tax year, how a particular purchase, action, income reported on a 1099 form, or other "tax event" will affect a user's tax liability for the current tax year. Further embodiments of the present invention are operable to predict, at an intermediate time in the current tax year, the user's tax liability for the current tax year.

The prediction provided to the user may include at least one of a type of deduction or credit and an amount by which the tax event affects the user's tax liability. The prediction may be made at any point or time in the current tax year, defined as an intermediate time in the current tax year, such as in conjunction with the tax event.

The "current tax year" is defined herein to include January 1 of the calendar tax year at issue through at least December 31 of that same calendar year, and may also include, as applicable, the period from January 1 of the immediately following calendar year through the date of the legally mandated tax filing deadline for the calendar tax year (e.g., April 15th).

In embodiments of the present invention, the prediction is based on both known and predicted user information. The known information includes user information related to the user and their taxes, including the user's tax information, and regarding at least a portion of at least one prior tax year and/or information to date within the current tax year. As more information is known, whether it is additional information for at least one prior tax year or more tax information within the current tax year, a probability of an accuracy of the prediction will likely increase. However, because embodiments of the invention base the prediction of tax liability on a variety of factors, as discussed herein, the predictions can be made with a high degree of accuracy.

Predicted user information includes tax information predicted for a remainder of the current tax year. For example, the user's income to date may be known while the user's income for the remainder of the tax year may be predicted. In embodiments of the present invention, stored information regarding the user, including the user's known tax information, tax rules, and/or purchases or actions made by the user, are analyzed to determine if the user should be prompted to input additional information to determine the impact of a tax event.

In even further embodiments of the present invention, based on known and predicted user information, tax events can be suggested to the user for maximizing the user's tax benefits.

System Description:

FIG. 1 illustrates a system 10 configured for predicting the affect or impact a tax event will have on a user's tax liability. The system 10 is configured for receiving, accessing, and/or creating a user profile 12 and a tax event profile 14. The system 10 is also configured for comparing the user profile 12 and the tax event profile 14 with a deduction database 16 comprising a plurality of tax deductions and/or credits and their corresponding eligibility requirements and rules. Based on this comparison, the system 10 can determine one or more relevant deductions or credits, a probability that the tax event qualifies for the relevant deductions or credits, and/or an amount by which the deduction or credit is predicted to raise or lower the user's tax liability. This allows the user to determine the tax benefits of a particular tax event at any intermediate time during the same tax year as the tax event.

The types of tax events affecting the user's tax liability are numerous and include purchases made by the user; actions taken by the user, such as investing in an IRA or 401(k), making a charitable donation, having a child, or reaching a particular birthday (such as the age when one can begin withdrawing without penalty from a 401(k)); and actions taken by others but affecting the user, such as the user receiving a raise. In embodiments of the present invention, any information located on 1099 forms may comprise a tax event. For example, if a user has reportable income interest, this information is provided on a 1099-INT and may affect the user's tax liability. Similarly, the user's sale of certain securities is reported on a 1099-B, or the dividends and capital gains distributions received from stocks or mutual funds is reported on a 1099-DIV. For each of these tax events (e.g., earned income interest, sale of securities, dividends received from stocks, etc.) embodiments of the present invention use the information for predicting the user' tax liability. For ease of reference herein, certain embodiments of the present invention will be described with respect to a purchase of a good or service. However, it is to be understood that embodiments of the present invention can be used for predicting how any tax event, including income reported in a 1099 form, will affect the user's tax liability for the current tax year and at an intermediate time in the current year.

The system 10, as illustrated in FIG. 1, comprises at least one user device 18 and one or more databases 20 that may be integral with or accessible by the user device 18. The databases 20 comprise the deduction database 16, one or more of the user profiles 12, and/or one or more tax event profiles 14 associated with one or more of the user profiles 12. The databases 20 and/or portions of the databases 20 may be stored on one or more memory elements located at one or more locations and accessible by the system 10.

In embodiments of the present invention, the user device 18, as illustrated in FIG. 1, is configured for receiving or accessing the databases 20 and purchase data and communicating to the user a type of deduction or credit, a probability of receiving a particular deduction or credit, and an amount by which the deduction or credit may lower the user's tax bill. The user device 18 may be any of a mobile communication device, a personal computer, a laptop, a mobile phone, a smart phone, a PDA, or other suitable devices. The user device 18 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system 10. In various embodiments of the invention, the user device 18 may comprise a memory element 22, a communication component 24, a display 28, and/or a user interface 30.

In embodiments of the invention, the user device 18 may implement a computer program and/or code segments of the computer program to perform some of the functions described herein. The computer program may comprise a listing of executable instructions for implementing logical functions in the user device 18. The computer program can be embodied in any non-transitory computer readable storage medium for use by or in connection with an instruction execution system, apparatus, or device, and execute the instructions. In the context of this application, a "non-transitory computer readable storage medium" can be any means that can contain, store, communicate, propagate, or transport the program for use by or in connection with the instruction execution system, apparatus, or device. The non-transitory computer readable storage medium can be, for example, but not limited to, an electronic, magnetic, optical, electro magnetic, infrared, or semi conductor system, apparatus, device or propagation medium. More specific, although not inclusive, examples of the non-transitory computer readable storage medium would include the following: a portable computer diskette, a random access memory (RAM), a read only memory (ROM), an erasable, programmable, read only memory (EPROM or flash memory), and a portable compact disk read only memory (CDROM), and combinations thereof.

The non-transitory computer readable storage medium and the computer program embodied thereon may be remotely accessible by the user device 18, such as via a web browser over the Internet or a mobile application (an "app"). The various actions and calculations described herein as being performed by or using the computer program may actually be performed by one or more computers, processors, or other computational devices, such as the user device 18 described herein, independently or cooperatively executing portions of the computer program.

The memory element 22 may be integral with the user device 18, stand alone memory, or a combination of both. The memory element 22 may include, for example, removable and non removable memory elements such as RAM, ROM, flash, magnetic, optical, USB memory devices, and/or other memory elements. The memory element 22 may store one or more of the databases 20 or profiles 12,14 described herein, code segments for accessing and using the databases 20 or profiles 12,14, and/or other data for instructing the user device 18 to perform the functions and methods described herein. The memory element 22 may comprise a plurality of memory elements located within the user device 18 and/or located at a plurality of locations and accessible remotely via the communication component 24.

The communication component 24 may comprise a wireless transmitter/receiver, antenna, or any other wired or wireless devices operable to send and/or receive data signals to and from the user device 18. For example, in some embodiments of the invention, the user profile 12, the tax event profile 14, the deduction database 16, and/or the computer program described herein may be stored in separate locations or in separate memory elements and may be accessible remotely, such as over the Internet. Thus, the communication component 24 may be configured for sending and receiving data regarding the user profile 12, the tax event profile 14, the deduction database 16, and/or tax-related data calculated or otherwise determined using the computer program.

The display 28 may comprise a graphical interface operable to display visual graphics, images, text, etc. in response to external or internal processes and commands. For example, the display 28 may comprise conventional black and white, monochrome, or color display elements including CRT, TFT, LCD, and/or LED display devices. The display 28 may be integrated with the user interface 46, such as in embodiments where the display is a touch screen display to enable the user to interact with it by touching or pointing at display areas to provide information to the user device 18. The display 28 may be coupled with various other components of the user device 18 and may be operable to display various information corresponding to the user profile 12, the tax event profile 14, the deduction database 16, the user's financial records, and/or data calculated by the user device 18 as described herein, such as a type of deduction or credit associated with a tax event, a probability of qualifying for a particular deduction or credit, and/or an amount by which the deduction or credit associated with the tax event may reduce the user's tax bill.

The user interface 30 may enable one or more users to share information and commands with the user device 18 or system 10, such as information about the user to populate the user profile 12, information about a tax event to populate the tax event profile 14, a copy of a receipt and/or verification associated with the tax event, or any other information useful in determining the user's eligibility for a tax deduction or credit and/or an impact a tax event may have on the user's total amount of taxes owed to the government. The user interface 30 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, an optical scanner, and combinations thereof. The user interface 30 may also include a speaker for providing audible instructions and feedback. Further, the user interface 30 may comprise wired or wireless data transfer elements, such as the communication component 24, a removable memory, data transceivers, and a transmitter, to enable the user and other devices or parties to remotely interface with the user device 18 or the system 10.

User Profile Description:

The user profile 12 includes any user information germane to determining the affect of the tax event on the user's tax liability or the user's overall tax liability, including known and predicted information. The user profile 12 may be created by the user via the user interface 30 by obtaining information about the user from a plurality of sources, databases, or a combination thereof. For example, income information about the user may be entered via the user interface 30 and/or downloaded from the user's bank account, prior year(s) tax returns, financial management software, payroll software, financial institutions holding tax-related information for the user, or any other designated source. The user profile may include, but is not limited to, any of the following information: name, social security number, age, sex, address, country of residence, state of residence, state of employment, employer name and location, whether the user is self-employed, occupation/profession/trade, whether the user travels for their occupation, whether the user wears a uniform or uses a car for their profession, income, tax bracket, prior tax returns, prior deductions, medical/insurance coverage, number and age of dependants, education information, taxable property information, and investment information. The user profile may also include the user's marital status and/or any of the information listed above for the user's spouse, such as the spouse's income and occupation.

The user's occupation may include, for example, a teacher, a student, a job seeker, or a member of the armed forces. The user's income and tax bracket may be determined based on one or more of the following: user input, previous tax returns, year-end wage and tax statements, bank account information, payroll information, information obtained or downloaded from financial management software, and government-set tax bracket thresholds. The user's income information may include gross taxable income amounts for one or more previous years and/or a current year's projected/predicted income entered by the user or estimated via the computer program based on an amount of income received year-to-date. The tax bracket information may include the user's tax bracket for one or more previous years and/or a projected/predicted tax bracket of the user for the current year entered by the user or estimated by the computer program associated with or accessible by the user device 18. Education information may include if the user is a current student, if the user is currently paying student loan interest, how much student loan interest the user is paying, and what degree the user is seeking. Taxable property information may include the value or estimated value of the property owned by the user, amount of property tax paid on the taxable property, an estimated amount of property tax to be paid on the property for the current year, and an amount of tax-deductible interest paid or expected to be paid for the year. Investment information may include information regarding stocks, bonds, 401(k) contributions, IRA contributions, and other investments made and/or expected to be made by the user during the year.

Note that the user profile 12 may include any information about the user that may be relevant in determining the user's tax liability, including eligibility for a particular tax deduction or credit. As discussed below, embodiments of the present invention query the user to obtain, or otherwise obtain, information that is germane to determining tax liability, such as whether the user has any business-related expenses based on their occupation. Furthermore, as tax laws change, additional information may be required by the user profile 12 to determine the user's eligibility for a particular deduction or credit. Additionally, in some embodiments of the invention, the user profile 12 may include information about more than one user, such as a plurality of members in a household. For example, for married users filing a joint tax return, the user profile 12 may include income and employment information for both a husband and a wife.

In embodiments of the present invention, the user profile 12 is supplemented throughout the tax year as additional information regarding the user becomes available or is learned by the computer program.

Tax Event Profile (Purchase Profile) Description:

The tax event profile 14 may include a plurality of information regarding a past, current, or future tax event, such as income reported on a 1099 form, a purchase, or action affecting tax liability. By determining a tax benefit of a contemplated tax event, the user may determine whether or not they want to make a purchase or take other action affecting tax liability. The tax event profile 14 may encompass one or more incomes reported on a 1099 form, purchases, actions, or events.

In certain embodiments, the tax event profile 14 may include information related to purchases that affect a user's tax liability. However, as can be appreciated, the tax event profile 14 may include information associated with other events and action, such as incomes reported on a 1099 form, which will be discussed in more detail in the next section. In addition, although certain functions and features of embodiments of the present invention may be discussed with reference to purchases, such functions and features may similarly be applicable to other tax events, such as incomes reported on a 1099 form.

Beginning with tax events comprising purchases, embodiments of the present invention allow for a plurality of methods of inputting information regarding a purchase into the tax event profile 14. Such input methods include inputting manually via the user interface 30; downloading from a digital receipt; detecting from a digital receipt or a digital image of a physical receipt (for example, optically scanned or photographed); retrieving (such as via a look-up table) or downloading based on a UPC (a "Universal Product Code") entered by the user or obtained from an image of a bar code on the receipt; downloading from a terminal at a POS (a "Point of Sale"); e-mailing from a POS terminal and to the user's account associated with the computer program of the present invention or to the user and then downloaded to the tax event profile 14; or downloading from a financial institution or financial management software. For example, the user's records from a financial institution or financial management software may be filtered via a computer program associated with or accessible by the user device 18 to identify and/or tag purchases corresponding with a particular category, such as a medical expense, work-related, education-related, or any other category that may have tax implications. A tag, as defined herein, may be any stored indicator that a particular purchase or tax event belongs with a particular category. In some embodiments of the invention, a purchase may be tagged automatically or tagged by user selection, as described below. A tax event profile may be created for each of the relevant purchases found in the particular category and used as described herein to determine a relevant deduction or credit associated with the purchase.

In embodiments of the invention, information on a receipt may be interpreted via the computer program associated with or accessible by the user device 18 based on product codes listed on the receipt and a store or retailer name listed on the receipt. If a plurality of products are listed on a single receipt, but only some of the products are relevant for tax deductions or credits, the non-relevant products may be omitted from the tax event profile 14 or grouped together in a separate tax event profile. Furthermore, if items on a single receipt are related to different types of deductions, the items may be grouped into separate tax event profiles according to one or more tax event profile parameters. If a plurality of tax event profiles are created for a plurality of purchases that are each later determined to relate to the same deduction or credit, these tax event profiles may be merged together by the user or automatically via the computer program described herein.

The tax event profile 14 as pertaining to purchases may include, but is not limited to, any of the following information: name of item or service purchased, date and/or time of purchase, location of purchase (i.e., merchant or retailer name and/or location), category or purpose of purchase (i.e., medical expense, business/work-related expense, charitable contribution, product specific), description of purchase (may include key words to search, a merchant code, a UPC, and/or a bar code), and amount of the purchase. In some instances, the amount of the purchase may separately include a sales price and an amount of sales tax paid on the purchase. When populating the tax event profile 14, the user may be provided with a list or drop-down menu of deductible products or categories that correspond to the information being entered by the user. The user may select from a menu of categories and/or products to properly identify the purchase and then enter the amount spent on the purchase.

It is to be appreciated that in instances where information regarding the purchase is downloaded from a digital receipt, detected from a digital image, downloaded based on a UPC, or otherwise automatically entered, then the user is not required to manually enter the amount spent on the purchase or other information otherwise known via the download. Similarly, in embodiments of the present invention, the user may request or allow for the receipt to be downloaded automatically to the user's mobile wireless communications device and to an application running the computer program of the present invention. For example, the user's mobile device may be operable to access the application, which comprises at least a portion of the code segments of the computer program. At the POS, the user may download the receipt or purchase information to the application, thus allowing the user to tag, itemize, or otherwise categorize the purchase at the user's convenience. Allowing the user to categorize the purchase as close to the POS as preferable for the user assists in preventing the user from forgetting to categorize the purchase or miscategorizing. Additionally, the user does not have to download the receipt at a later date. Downloading information to the user's mobile device for the tax event profile 14 could be performed through known communications means, including Bluetooth, WiFi, the Internet, RFD, etc.

In even further embodiments of the present invention, once the receipt is downloaded to the tax event profile 14 of the computer program, the receipt is matched to an incoming transaction on the user's financial management software. For example, the computer program of the present invention may download the user's financial transactions from the user's bank account. Because the receipt is stored in the tax event profile 14 accessible by the computer program, the program matches the receipt to the particular financial transaction. Such matching could be performed using various identifying criteria, including an amount of the financial transaction as compared to a known amount associated with the receipt and a merchant name received via the downloading of the financial transaction as compared to a known merchant name associated with the receipt. Thus, embodiments of the present invention periodically match the downloaded financial transactions with downloaded receipts. Such matching could be performed upon downloading the financial transaction, upon downloading the receipt, upon manual instruction by the user, or at predetermined time intervals, such as once a week.

Further, if the user tagged or otherwise itemized the downloaded financial transaction, the receipt is automatically stored with the tagged information. Therefore, a search of all business related expenses within a particular time period would locate any receipts tagged as business related expenses.

Tax Event Profile (1099 Profile) Description:

As noted above, tax events are not limited to purchases but may also comprise any action that affects the user's tax liability. In embodiments of the present invention, the tax event may include financial information commonly reported on a 1099 form, such as a 1099-DIV, 1099-INT, 1099-A, 1099-B, 1099-C, 1099-CAP, 1099-G, 1099-H, 1099-K, 1099-LTC, 1099-MISC, 1099-IOD, 1099-PATR, 1099-Q, 1099-R, 1099-S, 1099-SA, and other similar forms. As known, the U.S. government requires income subject to backup withholding to be reported on a 1099 form, and the type of income determines the type of 1099 form. This income may affect the user's tax liability. Embodiments of the present invention estimate and predict the tax liability associated with income reported on a 1099 form and suggest actionable recommendations based on the estimated and/or predicted tax liability.

In more detail, embodiments of the present invention include a computer program, a method, and a system for receipt or input of income information reported on a 1099 form. In certain embodiments, a calculator may be provided by a financial institution, a tax preparer, or via financial management software for receiving the income information reported on a 1099 form and for determining an associated tax liability. For example, the calculator may comprise code segments executed by the computer program of the present invention, and the calculator may be accessible on a website, via a mobile application, or via other software (collectively, a "site") of the financial institution, tax preparer, or financial management software provider. The user may enter into the calculator a minimal amount of known user information necessary for determining the tax liability resulting from the income information provided on the 1099 form. Alternatively, the calculator may import or otherwise access the known user information for the user from the user's financial management software, from other financial institutions, including banks at which the user holds an account, from the user's financial management software, or from a tax preparer's database storing known user information. As previously described, embodiments of the present invention may further provide for a prediction of additional user information for the remainder of the tax year based on the received known user information.

Financial institutions may commonly hold or otherwise generate the income information reportable on the 1099 forms. The financial institutions may be banks, stock brokerage providers, or other financial services providers. It is to be appreciated that income information reportable on a 1099 form may come from numerous and varied institutions or entities, and therefore, reference to a financial institution for providing 1099 income information is not intended to be limiting. In addition, the income information reportable on a 1099 form may be provided directly by the user, the user's tax preparer, or imported from tax preparation software. Exemplary types of information reportable on a 1099 form and held by the financial institution include, without limitation, interest, dividends, payments, proceeds, distributions, sales, etc.

If the user would like to determine how the 1099 income affects the user's tax liability, the user may input or import the minimum known user information and input the income information reportable on a 1099 form into the calculator at any time in a given tax year (regardless of whether the calculator is available at the financial institution's website, at the tax preparer's website, as part of the user's financial management software, etc.). In alternative embodiments, the user may upload or push, or authorize to be uploaded or pushed, the minimum known user information and the income information reportable on a 1099 form to the calculator and from third-party sources, such as financial management software, the user's tax preparer, or other financial institutions. Once the known user information has been received, embodiments of the present invention compare the known user information (including any predicted information) along with the income information reportable on a 1099 form with requirements for tax deductions and tax credits. After identifying potential deductions and credits, embodiments of the present invention may predict the impact of the user's 1099 form income on the user's tax liability. Embodiments of the present invention may also use the user information and 1099 income information to predict the user's overall tax liability. In even further embodiments, the present invention may suggest to the user to take certain actions that may affect the user's 1099 form reportable income. Such actions may be suggested, for instance, to reduce the user's tax liability.

In certain embodiments of the present invention, the calculator is operable to project an end of year 1099 reportable income. Such projected end of year 1099 reportable income may be determined independently, or the projection may be determined as part of the determination of the user's tax liability, as described immediately above. The end of year 1099 reportable income may projected based on a combination of factors, including one or more of the following: the 1099 reportable income for one or more prior tax years, the 1099 reportable income for the tax year to date, a remaining amount of time left in the current tax year, and models for tax events outside the user's control, such as historical and/or projected fluctuations in the stock market, interest rate, or other similar economic indicators. For example, if the user has received two of four quarterly dividends from a particular company, the present invention can project at an intermediate time during the tax year the end of year 1099-DIV information for the company based on the dividends received at the intermediate time, the number of quarters remaining in the current tax year, and/or other economic indicators.

Embodiments of the present invention additionally provide for a prediction and a presentation of an accuracy probability for the projected end of year 1099 reportable income. Depending on the type of 1099 reportable income, certain predictions or estimations may have a higher accuracy probability than others. For example, dividends, or a mean or medium of dividends, may be relatively consistent quarter-to-quarter for a particular company, as noted in the above example. The calculator of embodiments of the present invention is operable to review past history for the user's 1099 reportable income and project models of future 1099 reportable income based on the past history. As can be appreciated, the more historical data reviewed by the model, the higher the probability of future predictions. In addition, accuracy probability may take into consideration a remaining amount of time left in the current tax year.

In even further alternatives, the calculator may estimate the end of year 1099 reportable income on based specific economic indicators. For instance, for dividend income, embodiments of the present invention may analyze information for the remainder of the tax year based on individual stock information. In more detail, a first stock held by a user for which the user receives dividends may be historically consistent, whereas a second stock may be volatile and otherwise fluctuate. For the historically consistent stock, the present invention may provide a relatively high probability of accuracy. For the volatile stock, the present invention may provide a lower probability of accuracy. To compensate for this lower probability, the present invention may employ one or more mathematical models or algorithms to increase the accuracy probability of the prediction.

In embodiments where the calculator is accessible via the financial institution's website, the user may also have the option to import or otherwise access the tax event information for preparation of the user's tax returns. In particular, the user or the user's tax preparer, as the case may be, may upload the tax event information embodying the 1099 reportable income information and associated predictions or estimations to the user's or tax preparer's tax estimator. It is to be understood that the user may initiate the uploading or the user may authorize a third party to initiate the uploading.

Thus, embodiments of the present invention contemplate that the calculator for the 1099 reportable income can be used independently to predict a user's total end of year 1099 form reportable income, or the calculator for the 1099 income may be employed in the tax event calculator utilizing the user profile 12 information of the present invention to determine or predict a user's overall tax liability. For instance, embodiments of the present invention may compare known user information, predicted user information, and end of year 109 reportable income to identify deductions or credits that may have an impact on the user's tax liability. The calculator for the 1099 income information may be accessible or otherwise consolidated with the tax event profile 14 of the present invention. As such, the tax event profile 14 of the present invention includes the 1099 reportable income, and the prediction and estimation features of the present invention employ the 1099 reportable income to determine the user's tax liability.

Deduction Database Description:

The deduction database 16 may comprise a list and description of a plurality of tax deductions and credits offered by one or more governments (e.g., state, federal, and local) or taxing authorities. Furthermore, eligibility rules and requirements for each of the deductions and credits may be stored in the deduction database 16. The rules and requirements are preferably consistently updated and, at the least, updated annually with any new rules or regulations.

If the tax event is income reported on a 1099 form, such as proceeds from a stock sale, the rules and requirements may correspond to limits on tax deductions or write-offs that may impact whether the user should make a stock sale and incur the additional 1099 form reportable income. If the tax event is a purchase, the rules and requirements may correspond with a specific product purchased, a category of the product purchased, an amount of the purchase, the user's medical/insurance coverage and an itemization threshold, the purpose of the purchase, the date of the purchase, the amount of sales tax paid on the purchase, income of the purchaser, age of the purchaser, location of the purchase, profession of the user, and/or the user's prior tax returns and/or deductions. For example, a record in the deduction database 16 may describe an eligible category, one or more eligible products or items, a list of eligible organizations, and/or other rules or requirements for a qualifying deduction or credit. In contrast, if the tax event is an action, such as investment in a 401(k) or a birthday, the rules and requirements may correspond to non-taxable limits for 401(k)

investments or a date on which the user may begin withdrawing invested funds without penalty. As such, it is to be appreciated that the deduction database includes all rules and regulations affecting whether the user can take the deduction or credit based on the user and tax event information contained in the user and tax event profiles.

The rules and requirements for credits and deductions may be published by one or more governments via various government bureaus or other taxing authorities, such as the Internal Revenue Service (IRS) in the United States, and may be entered into the deduction database 16 and/or periodically updated by a provider or author of the computer program described herein.

Operation of the Computer Program:

In use, the computer program stored on the computer readable storage medium associated with and/or accessible by the user device 18 may be executed to compare information in the user profile 12, the tax event profile 14, and the deduction database 16 and identify deductions or credits applicable to the income reported on the 1099 form, purchases, and/or actions.

Figure 2:
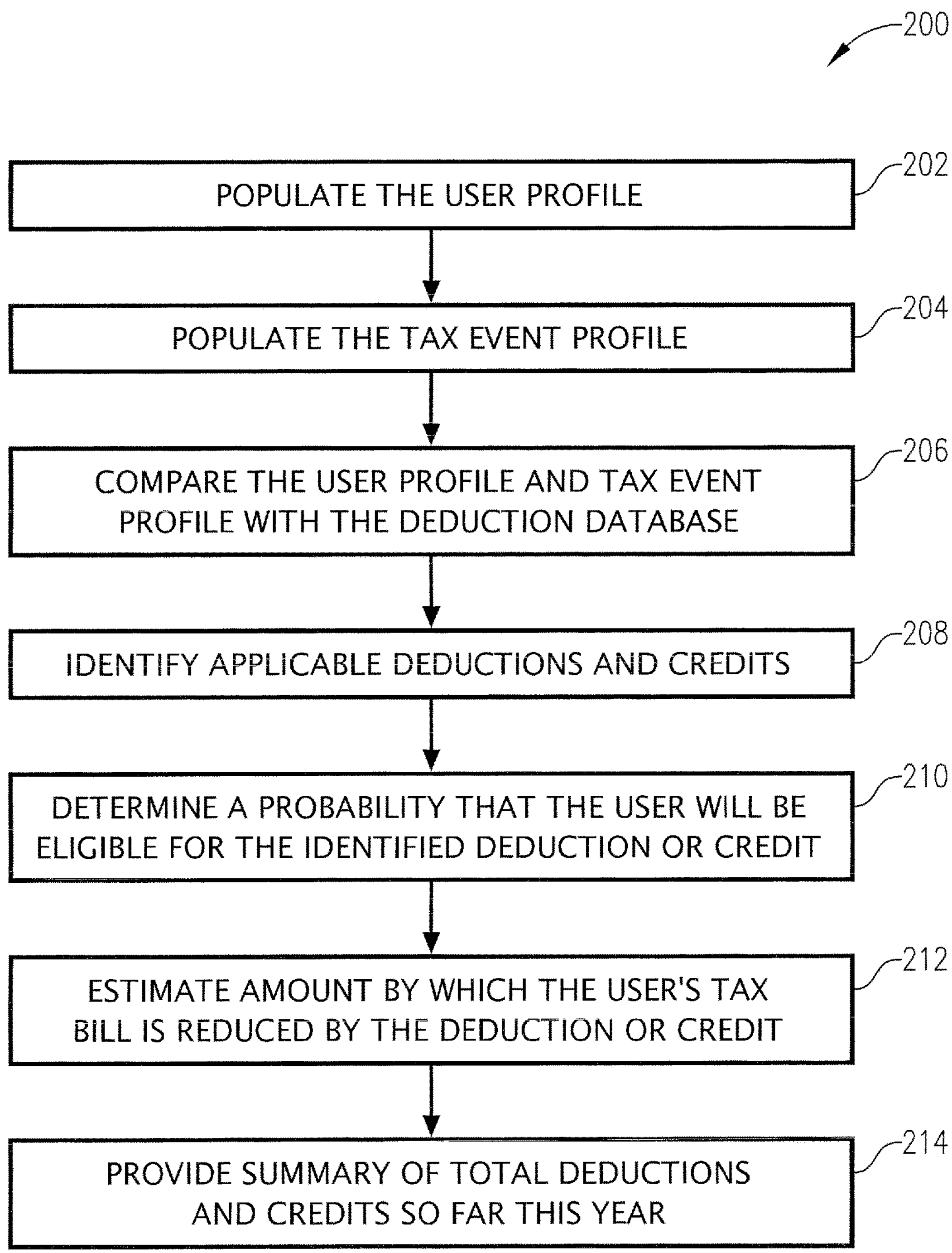
FIG. 2 is a flow chart of a method of determining tax benefits of a purchase according to an embodiment of the present invention.

The flow chart of FIG. 2 depicts the steps of exemplary methods of the invention in more detail. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

FIG. 2 illustrates a method 200 of determining tax benefits associated with one or more tax events. The method 200 may comprise populating the user profile 12, as depicted in step 202, and populating the tax event profile 14, as depicted in step 204. For example, upon a first use of the computer program, a plurality of information about the user and one or more tax events may be requested via the user device 18 to populate the user profile 12 and the tax event profile 14. The computer program may provide a brief, guided interview to determine if a tax event is deductible and/or provide decision tree logic to assess if a tax event is deductible. Additionally, the computer program may be configured to download various user and tax event information from various locations, such as financial management software, a financial institution, financial service provider, tax software, a POS terminal, digital or imaged receipts, or directly from the user. Alternatively, the code segments comprising the features of the present invention may be incorporated in financial management software or tax software. Once the user profile 12 is created, it may be stored and accessed throughout the year for determining credits or deductions associated with new tax events. The user profile 12 may also be periodically updated throughout the year by the user and/or via automated downloads of financial statements from financial institution websites or financial management software.

The computer program may additionally comprise and/or be configured to access a search engine, thereby allowing keywords entered by the user to be located within the deduction database 16 and/or various portions of the computer program. For example, a category of a tax event, a purchase, a profession, and/or an item purchased may be located in the deduction database 16 via a keyword search or selected from a menu of options.

The tax event profile 14 may be created before, simultaneously with, or after an action associated with income on a 1099 form, a purchase, and/or action. To determine how a future tax event could affect tax liabilities, the user may input various information about the future tax event, such as type of action associated with income on a 1099 form, monetary amount of action, date of action, location of action, type of purchase, predicted date of purchase, location of purchase, the product or service provider, or other similar information. Some or all of this information may be uploaded from various locations, such as email, websites, scanned images, catalogs, and other sources providing service or product information.

Creating the tax event profile 14 may be performed using the communication component 24 of the user device 18. Furthermore, the user may manually input information regarding the tax event via the user interface 30. Additionally, if different tax events fall under different categories, the user may select an option to tag each of the items relating to the tax events individually according to their applicable category. As noted above, tagging a plurality of items for tax events allows the user to properly categorize each item while its purpose is still fresh in their mind.

Creating the tax event profile 14 after the tax event has happened may include any combination of the methods described above. For example, the user may input a transaction via the user interface 30 or download one or more transactions via financial management software or websites. Additionally or alternatively, the user may optically scan physical bills or receipts or download digital bills or receipts, such as those received via email. Furthermore, the tax event profile 14 may be populated using the plurality of methods described above. For example, a tax event profile created from a transaction downloaded via some financial management software may simply indicate a check for a particular amount was deposited by the payee on a particular date. However, the user may add to the tax event profile by inputting what the tax event, the date of the tax event, or additional related information. Furthermore, the tax event profile 14 may be edited or amended as needed. For example, a tax event profile 14 may be created but edited or amended at a later time or date.

The user profile 12 and the tax event profile 14 may be compared with information stored in the deduction database 16, as depicted in step 206, and may identify applicable deductions and/or credits associated with the user and the tax event, as depicted in step 208. For example, a code segment of the computer program may be executed to determine if the tax event is a credit, a deduction, or both. A list of suggested deductions or credits may be provided to the user if an exact match cannot be found in the deduction database 16. In some instances, a deduction or credit must match a plurality of user and tax event criteria to be considered applicable. For example, some deductions or credits must correlate with both the user's occupation and the type of tax event. Additionally, in some embodiments of the invention, the deduction or credit corresponding with the user's occupation and type of tax event may only be provided to the user if their income or projected income is below a particular threshold.

Many deductions are category-specific deductions. Thus, in embodiments of the present invention, the computer program uses a plurality of already-known user information and tax event information to automatically tag or categorize a tax event. For example, for a tax event that is a purchase, if it is known that the user is a job seeker and they made a purchase from a copy provider, such as Kinko's®, the computer program may automatically tag the purchase as a work-related or job search related expense. Additionally or alternatively, the computer program may be prompted to ask the user if the purchase was a job search related expense.

The tags or categories assigned to each tax event or tax event profile can be used to identify associated deductions or credits.

In embodiments of the present invention, the computer program may comprise or have access to a list of common or well-known financial institutions, financial service providers, or retail stores, as the case may be, identified as being associated with one or more categories of tax events. Thus, when tax event information is received from a financial institution, financial service provider, or retail store included on this list, the computer program may automatically tag the tax event according to the institution's or provider's associated category. Additionally or alternatively, the computer program may be configured to prompt the user for additional information based on the tag or category automatically assigned to the tax event and/or other information about the user.

For example, for a tax event that is a purchase, if the user is a teacher and purchases items from an office supply store, the computer program may be prompted to display the following question: "Is this a classroom expense?" in another example, if a user has no dependents, according to the user profile 12, but the user's financial records show an amount given to an elementary school, the computer program may display the following question: "Is this a charitable contribution?" Thus, embodiments of the present invention actively prompt the user for information regarding a tax event based on known user and/or tax event information.

Figure 3:
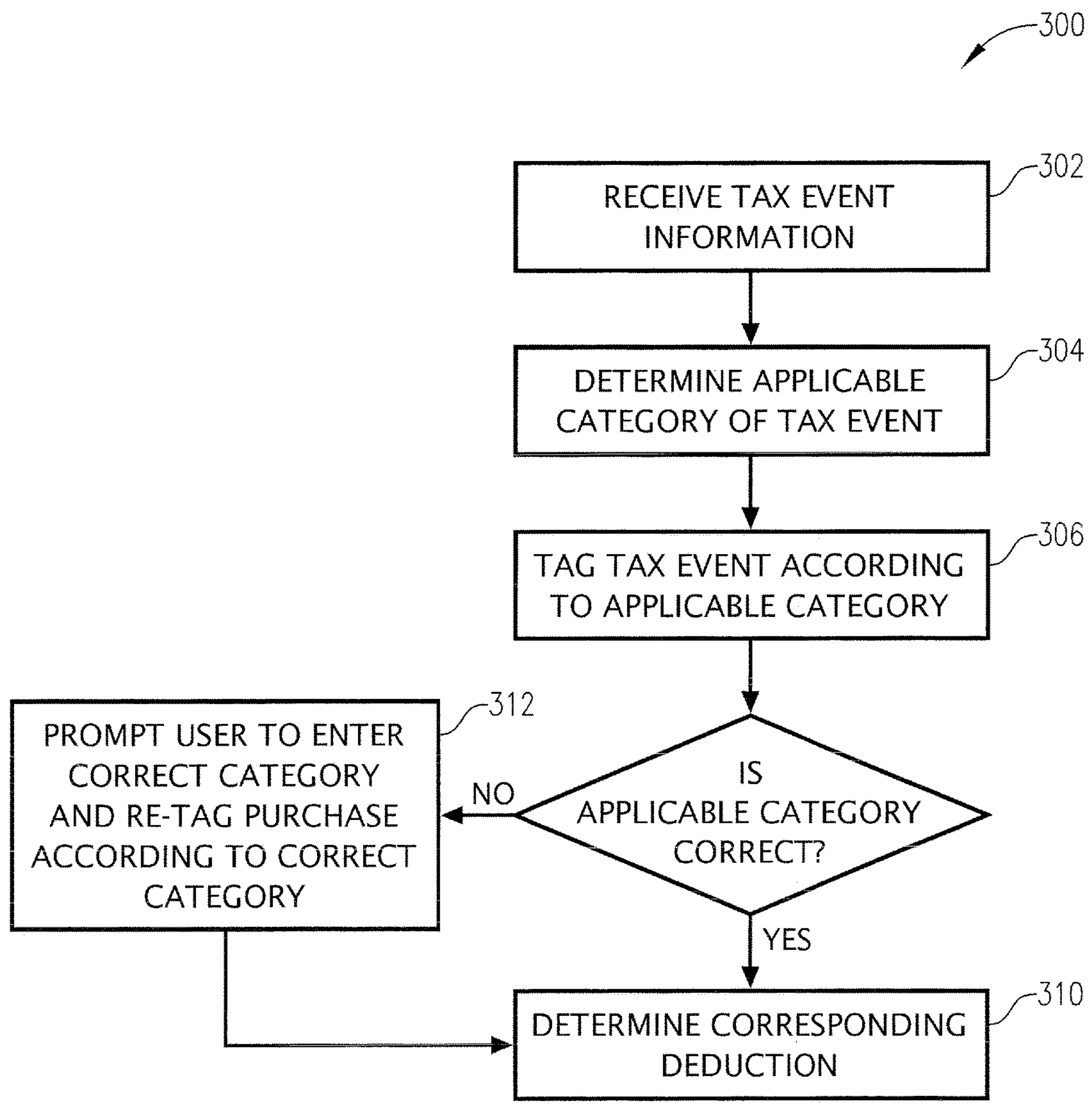
FIG. 3 is a flow chart of an automated method for categorizing purchases to determine associated deductions.

The computer program may use a plurality of rules and thresholds to recognize trends regarding the user and the user's tax events and to determine appropriate questions to ask the user or an appropriate tag to apply to a tax event. An exemplary method 300 of analysis to determine if the user should be prompted to provide additional information is illustrated in FIG. 3. Code segments for executing the method 300 may be included in the computer program, as described herein.

The flow chart of FIG. 3 depicts the steps of exemplary methods of the invention in more detail. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method 300 may comprise receiving tax event information, as depicted in step 302. Receiving tax event information may include, for example, receiving tax event information from the tax event profile, receiving a transaction via financial management software, or receiving a bill, receipt, or other record of the tax event. As depicted in step 304, the computer program may then determine an applicable category of the tax event using tax event information, user information, or a combination thereof.

Next, the computer program may tag the tax event according to the applicable category, as in step 306, and/or prompt the user to confirm whether or not the applicable category applies to the tax event, as depicted in step 308. For example, for a tax event that is a purchase, if the user's occupation is listed as a driver of a commercial vehicle and the user inputs a purchase receipt from a gas station, the computer program may be prompted to ask the user the following question: "Is this a work-related expense?" If the user confirms that the applicable category does apply to the tax event, then the computer program may determine a corresponding deduction, as depicted in step 210. If the user indicates that the applicable category does not apply, the computer program may prompt the user to enter a correct category, as depicted in step 212. For example, a selectable list of other category options may be provided to the user. Once the correct category is entered by the user, the computer program may execute step 210 as described above.

Historical user information regarding the user and the user's tax events over multiple years may be used to identify trends via the computer program. For example, for tax events that are payments, if the user has a college-aged child and has made periodic payments to a particular university for the past two years, a new payment to this university may prompt the computer program to ask the user, "Is this an educational expense?" However, if the user does not have any college-aged children and is not currently a student, a payment to this university may prompt the computer program to ask the user, "Is this a charitable donation?" Similarly, the user profile may be populated with information regarding the user's previously-attended schools. When the new payment to one of the previously-attended schools is recognized, the computer program of embodiments of the present invention tags the payment as a charitable donation or asks the user if it is a charitable donation. These types of prompts for additional information from the user can be used by the computer program to obtain information necessary to determine an applicable deduction or credit.

Users are likely to submit tax events to the computer program that they believe may be deductible but may inadvertently omit other deductible tax events because they assume they would not be deductible. To prevent this inadvertent omission, the computer program may ask the user to enter additional tax event information corresponding to the user profile 12, or previous tax event information entered by the user. For example, if the user profile 12 indicates the user is unemployed or conducting a job search, the user may be asked to provide information regarding any tax events related to the job search. The user may also be provided with a list of selectable services related to job searches, such as resume advisor, copy services, postage, and/or courier services. Furthermore, the user may request additional information related to job search deductions, such as whether a suit purchased for an interview is a deductible expense. Alternatively or additionally, the user may be prompted by the present invention as to whether a purchase from a clothing store includes any job related expenses.

In embodiments of the present invention, if tax events are tagged or otherwise indicated to fall into a particular category, a code segment of the computer program may be executed to prompt the user to provide additional category-related information. For example, for the category of volunteer or charity donations or expenses, the user may be prompted to name the organization, and the computer program may be used to determine if the organization is listed in the deduction database 16 as a qualifying organization. The user may also be asked if they incur expenses for supporting the qualified not-for-profit organization, are a member of a board for the qualifying organization, have made direct donations for the qualified organization, donated goods such as clothing and household items, maintained an office at home for the qualifying organization, traveled on behalf of the qualifying organization, and/or incurred telecommunication expenses related to the qualifying organization.

Another example of category-specific information that may be requested via the computer program is information related to medical or health expenses. For example, the following information may be requested, accessed from the user profile 12, and/or calculated using various code segments of the computer program:

- Does the user have circumstances that would qualify as medical & health related expenses?
- What is the user's income (last year's tax return)?
- Does the user have employer sponsored health insurance (yes/no)?
- Does the user directly pay for individual/family health insurance coverage, such as COBRA (yes/no)?
- How much are the user's monthly health insurance premiums? Has the user's annual medical expenses exceeded the IRS threshold for deducting medical expenses?

In embodiments of the present invention, the user can also ask questions to be answered via the computer program. Various code segments of the computer program may be executed to retrieve or calculate responses to a variety of specific user requests, questions entered into a search engine, or questions selected from a menu by the user. Exemplary, although not exhaustive, questions include the following:

- What is the difference between a deduction and a credit?
- Can some purchases, such as new windows, qualify for both a deduction and credit?
- What energy tax credits are currently available?
- What profession/trade-specific tax credits are available to my profession?
- I have a home workspace; what qualifies as a deduction and how do I document this?
- Are my utility and telecommunications bills for home workspace deductible?
- How much could this save on my tax bill?
- How much sales tax have I incurred this year and will I exceed the standard sales tax deduction?
- I'm a teacher; can you tell me more about deductions or credits for classroom related expenses?
- What else could I buy that would qualify as a deduction and how much would I save on my tax bill?
- Tell me when and where there are sales tax holidays so I can maximize my savings with a deduction and a reminder to my calendar.
- What qualifies as tax free on the sales tax holiday in this location and how much could I save in addition to deductions?
- Import all of the deductions saved on my account into my tax return.

Some embodiments of the present invention also comprise one or more code segments of the computer program executable for determining a probability that the user will qualify for the deduction or credit, as depicted in step 210. The probability of being eligible for the tax deduction or credit may be displayed as a percentage value on the display 28. In other embodiments of the invention, if the probability is above a first particular threshold, the user device 18 may indicate to the user that the tax event is eligible for the deduction or credit. If the probability is below a second particular threshold, the user device 18 may indicate to the user that the tax event is probably not eligible for the deduction or credit. If the probability is between the second and first thresholds, then the user device 18 may indicate to the user that the tax event may be eligible for the deduction or credit. For example, the probability of eligibility for the deduction or credit may be classified using weighted thresholds: Yes (90% to 100%) Maybe (40% to 89%) or Not Likely (less than 40%). A general indication of "yes," "no," or "maybe" may be provided on the display 28 and/or via the user interface 30 in a variety of ways using any combination of words, phrases, symbols, colors, sounds, etc.

In some embodiments of the present invention, a user may receive a message via the user device 18 indicating they are "maybe" eligible for the deduction or credit, due to incomplete information in the user profile 12 and/or because a current tax year is not yet over and an end-of-year total income or total tax event information are required to calculate whether or not the user meets a particular threshold for the credit or deduction. For example, the accuracy of the probability at a later time within the current tax year will likely be higher than early in the tax year. For a more precise answer, a variety of assumptions and estimations based on the user profile 12, including known tax information related to the user for prior tax year(s), previous tax deductions or credits taken, income on a 1099 for to date, and known tax information related to the user for the current year to date, and/or various statistical norms for the user or various segments of the taxable population, may be used to predict a probability that the user will receive the credit or deduction. Additionally, the above-listed information, either alone or in combination, can be used to predict the user information for a remainder of the current tax year, thus supplying the computer program of the present invention with further information for predicting the probability that the user will receive the credit or deduction.

For example, if the user has qualified for deducting a certain portion of medical expenses for the past two tax years, then the probability of the user being able to deduct a medical expense, even at the beginning of the current tax year and without knowing the remaining medical expenses for the current tax year, may be "yes." However, if the user has not been able to deduct medical expenses for prior tax years, then the probability may be "not likely." The combination of using known information (e.g., amount of the tax event, type of tax event, prior year tax information, income made thus far, amount of taxes taken out of the user's paychecks thus far, etc.) with predicted information (e.g., predicted income, predicted tax bracket for the year, predicted amount of taxes taken out of the user's paychecks for the remainder of the year) allows the user to keep a more accurate running total of deductions or credits throughout the year.

In some embodiments of the invention, predicted user information, such as predicted income, may be assigned a probability of accuracy based on a variety of factors, such that the probability of receiving a particular credit or deduction may be based on the probability that the predicted user information is accurate. A probability of accuracy may be based on long-term trends, user-provided information, and/or how much of the year's income has been tracked thus far (e.g., a projection of annual gross income may be more accurate in November than in February). For example, if a particular deduction is at least partially based on falling below an income threshold, the user has not received more than a 5% raise in each of the past five years, and the user's income is 50% below the income threshold for the deduction, then the user has a high probability of being eligible for the deduction. Therefore, in this example, the user may be provided with information indicating that he/she is maybe or probably eligible for the deduction.

In additional to determining probabilities for deductions and credits, additional embodiments of the present invention also comprise one or more code segments of the computer program executable for determining a probability accuracy of the projected end of year 1099 form reportable income. The probability accuracy of may be displayed as a percentage value on the display 28 using any combination of words, phrases, symbols, sounds, numbers, etc. The probability accuracy may be based on 1099 accuracy probability information that may include information such as 1099 reportable income for one or more prior tax years, a remaining amount of time left in the current tax year, the type of income of the 1099 form reportable income, or other economic indicators.

If a particular tax event is indicated to be deductible or may be deductible, an amount by which the credit or deduction may lower the user's tax liability may be calculated via various code segments of the computer program, as depicted in step 212, using the amount of the tax event, limits or rules associated with the deduction or credit, and information from the user's profile about his/her income or tax bracket. The amount by which the deduction could reduce the user's tax bill may be calculated using deduction rules stored for each deduction in the deduction database 16. If any special rules or limits are specified in the deduction database 16, one or more code segments of the computer program may be executed to determine how much more the user could reduce their tax bill by taking certain actions to maximize their deductions in this category and then provide this information to the user via the display 28 or user interface 30. The user device 18, via the computer program, may also identify, save, and/or display any relevant content associated with the credit, deduction, or deduction category.

It is to be appreciated that some tax events may increase the user's tax liability. Consider a scenario where the user receives a small raise one year that changes the user's tax bracket or otherwise disqualifies the user's ability to take certain deductions. For example, if the user's income is close to a threshold amount for taking a student loan interest deduction, then the raise may actually increase the user's income to an amount where the user is disqualified from taking the deduction. In such a case, it may be that the raise is actually less money than the loss from being able to take the student loan interest deduction, such that the user actually pays more taxes. As such, embodiments of the present invention allow for the user to input the proposed raise and to determine the impact of this tax event on the user's overall tax liability by accounting for the user and tax event information.

Furthermore, based on the comparison of the user profile 12 and the tax event profile 14 with data stored in the deduction database 16, various code segments of the computer program may be executed to output any of the following information to the user via the display 28 or user interface 30: a description of matching deductions or credits, a qualification answer (i.e., Yes, Maybe, Not Likely), eligible amount of the deduction or credit (i.e., dollar amount or percentage of transaction), amount the tax benefit could reduce the user's tax liability, information on how the user can maximize tax benefits in this category, and links to additional relevant content on tax benefits in this category.

In embodiments of the present invention, the computer program recommends tax events and/or other actions to maximize the user's tax deductions or credits or to minimize the user's tax liability based on user and/or tax event information. For example, if the user previously deducted their computer as a business expense, but the computer has depreciated below a particular threshold, the computer program may recommend that the user should buy a new computer. Furthermore, the user may ask the computer program to recommend purchases for maximizing the user's tax deductions. In an exemplary embodiment of the invention, the user may ask, "Are there any purchases you would suggest for my situation that would qualify for a deduction?" and the computer program may be used to compile a list of suggestions based on the user profile 12, the user's purchases and deductions thus far, and information in the deduction database 16. For example, the suggestions may include the following:

"Buy more office supplies and deduct them; it could save another $80 on your tax bill."

"Buy a new laptop. You could capitalize the entire expense up front this year and it will save $120 on your tax bill."

"Buy a qualifying automobile and take advantage of the energy tax credit and opportunity to deduct the sales tax."

"Invest more in an IRA, because your tax bill is predicted to be higher for the current tax year than last year."

In embodiments of the present invention, the computer program may be programmed to suggest purchases from specific retailers based on advertising partners associated with the computer program provider. For example, office supplies from a specific office retailer may be suggested.

In embodiments of the present invention in which the tax event includes income reported on a 1099 form, recommendations may be made to the user to reduce the user's tax liability. For example, if the user has a $10,000 net long-term capital loss for the tax year to date, but only $3,000 of the loss is deductible, the computer program of the present invention may suggest that the user sell other stocks or securities to offset the gain. Alternatively, the present invention may suggest the user take other actions to evaluate and potentially reduce the user's tax liability, including consultation with a financial services advisor. Additionally or alternatively, the present invention may suggest or highlight sources of information the user may review to educate the user on limiting tax liability resulting from 1099 income information.

The user may be provided with an option to save the deduction/credit to a user account along with a description. In addition to saving the deduction or credit, the user may digitally or electronically attach or link evidence of a deduction, such as a photo/scan of a receipt or bill or an automatically-imported receipt from a financial partner, to the saved deduction. In embodiments of the invention, a threshold requirement for documentation or evidence of the purchase associated with the deduction or credit may be provided by the deduction database 16. For example, some deductions may require a receipt, a bill, or an invoice for the purchase. Some deductions have special rules or limits, such as a classroom teacher deduction of up to $250, which does not have to be itemized.

The saved deduction and credit information may be accessed via various code segments of the computer program to provide information regarding total deductions or credits identified year-to-date. This may require calculating or estimating what the user's income will be for the entire year based on the previous year's income and/or income received thus far in the current year. Additionally or alternatively, the user may provide a predicted gross income for the year. This enables a mid-year evaluation, i.e., an intermediate evaluation at any time throughout the current tax year, of the user's overall tax liability for the current year, which may be used by the computer program to recommend tax events and/or actions that the user could take to reduce his/her tax liability before the end of the year. For example, the user may ask or select the following question or option from a menu of questions: "What are my total deductions this year and how much will it save on my tax bill?" Then the computer program may be used to calculate these values and provide an answer to the user, such as the following via the display 28: "Your total deductions so far this year are $5,431 and this could reduce your tax bill by $2,645. Compared to other users in your category, you are very effective at maximizing your deductions. Keep up the good work."

Furthermore, a summary report of the user's total tax benefits saved within a current year thus far may be provided, as depicted in step 214, including any of the following information: total credits, total deductions, total number of "yes" (i.e., it is a deduction), total number of "not likely" (i.e., it is probably not a deduction), total number of "maybe" (i.e., it may be deductible), amount by which total deductions reduce the user's tax bill, amount by which total credits reduce the user's tax bill, amount of occupation-related deductions, amount of medical-related deductions, amount of charitable-related deductions, and amount of any other particular deduction or credit categories.

In embodiments employing the above-described 1099 calculator, a summary of the user's 1099 transaction information and reportable income may be generated. The report could be generated at the financial institution's site that aggregates the 1099 income information for the user, or the report could be generated by the tax preparer after importing the 1099 income information from the financial institution, or the report may be generated by the computer program directly onto the user's user device 18. Generated reports may separate the user's income information by the type of 1099 form with which the income would be associated, such as 1099-DIV, 1099-INT, 1099-B, etc. or the generated report may aggregate the reportable income information or my otherwise provide a summary of the reportable income.

In some embodiments of the invention, summaries and advice provided to the user may be based on an analysis of one or more tax event profiles 14 related to a particular category and the user profile 12. The computer program may then be used to determine the probability of a deduction or credit and advise whether the user should track expenses or tax events in this particular category. Some categories of tax events have a minimum based on the user's adjusted gross income. Thus, some tax events would only be of interest if the user's receipts as a whole for a category add up to move than 7.5% of their adjusted gross income or the rule otherwise in effect at the time of the tax scenario.

The deduction or credit and any information associated therewith may be imported into or used by various financial management and/or tax preparation software programs or databases. For example, a tax professional may import the user's deductions and review them along with the user's tax returns. Specifically, the tax professional or software may determine if the saved deductions or credits are allowable or not allowable, as well as providing an explanation of that determination. The user may also print reports of his/her predicted tax benefits. Furthermore, the user may print a receipt cover sheet to attach to purchase receipts for filing and record-keeping purposes.

Figure 4:
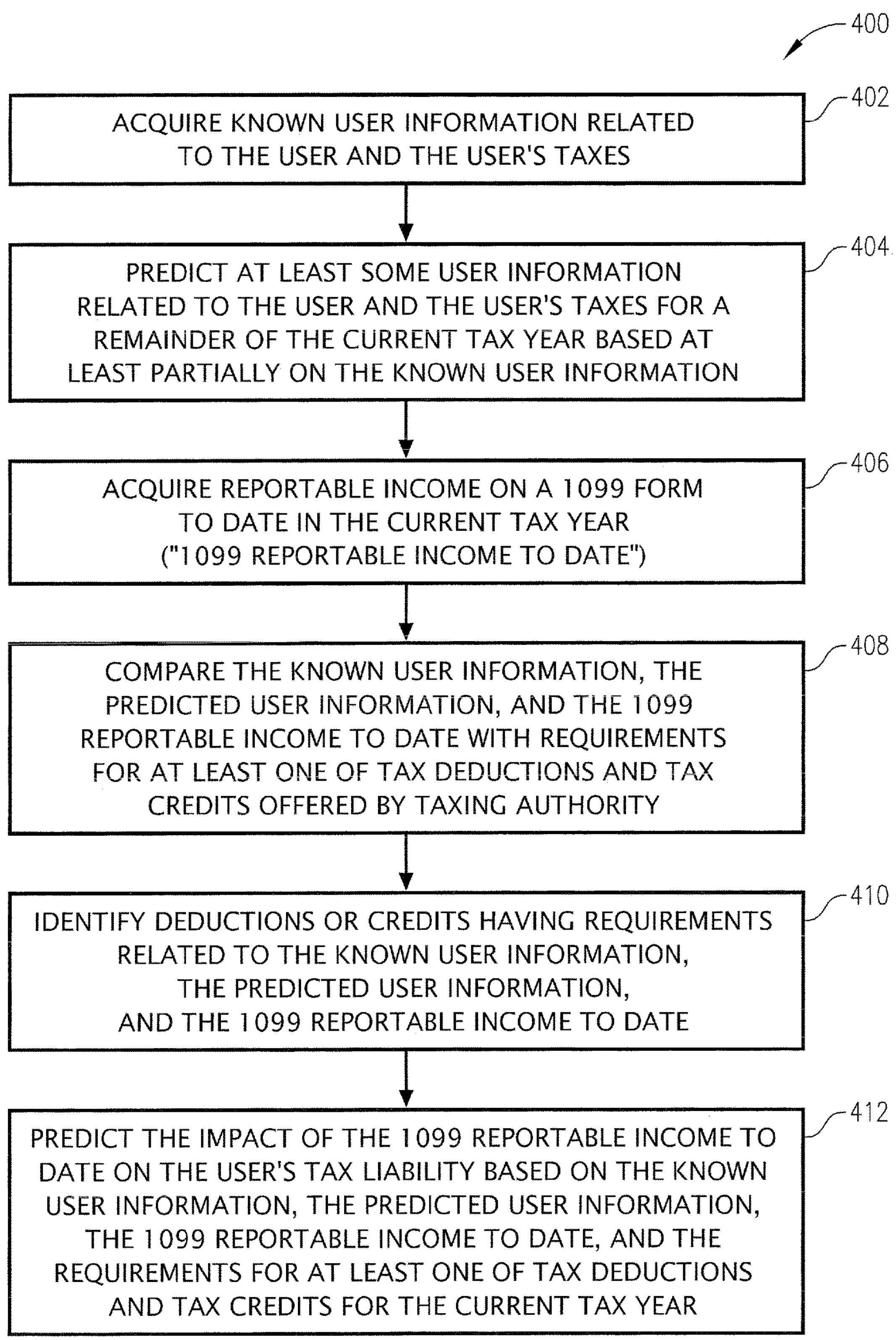
FIG. 4 is a flow chart of a method for predicting the user's tax liability based on, at least in part, the user's 1099 reportable income for a current tax year.

As previously described, the computer program may use a plurality of rules and thresholds to recognize trends regarding the user and the user's investments or other reportable income of a 1099 form. An exemplary method 400 of predicting the impact of 1099 reportable income is illustrated in FIG. 4. Code segments for executing the method 400 may be included in the computer program, as described herein.

In step 402, the computer program and method acquires known user information related to the user and the user's taxes. This acquiring of information can be performed as discussed above and include, without limitation, the user entering tax information and the program receiving uploaded information from a third-party source, such as the user's financial management software. In step 404, the computer program and method predicts at least some of the user information for the current tax year based at least partially on known user information from prior tax years and for the current tax year to date.

At step 406, the computer program and method acquires reportable income on a 1099 form to date for the current tax year. Similar to step 402, the 1099 reportable income to date can be acquired by manual entry via the user or another person or by uploading from a third-party source. At step 408, the computer program and method compares the known user information, the predicted user information, and the 1099 reportable income to date with the requirements for at least one of tax deductions and tax credits offered by a taxing authority. After the comparison, the computer program and method identifies deductions or credits having requirements related to the known user information, the predicted user information, and the 1099 reportable income to date, as set forth in step 410.

At step 412, the computer program and method then predicts the impact of the 1099 reportable income to date on the user's tax liability based on the known user information, the predicted user information, the 1099 reportable income to date, and the requirements for at least one of tax deductions and tax credits for the current tax year.

In additional embodiments of the present invention and similar to determining how a tax event affects the user's tax liability, the user's overall tax liability can be predicted at any intermediate time in the current tax year. As more information is inputted throughout the year into the computer program of the present invention, such as the user's purchases, investments, disbursements, dividends, and tax payments, the probability of the prediction of the user's overall tax liability becomes more accurate. However, embodiments of the present invention are operable to predict the user's tax liability based on prior user information, including prior year tax information related to the user, which further includes prior year tax event information; demographic information for the user; known user information to date, including known tax event information to date within the current tax year; predicted user information for a remainder of the current tax year; and the tax requirements and rules for the current tax year. Similar to predicting the impact of a tax event on the user's current tax year liability, embodiments of the present invention that predict the user's overall tax liability account for a variety of information.

For example, embodiments of the present invention allow the user to access the computer program of the present invention at any intermediate time in the current tax year and determine the user's tax liability. If the user is informed that they will owe taxes, embodiments of the present invention are operable to suggest tax events to the user to lower the user's tax liability, such as investing in a qualified fund or selling a particular stock or bond. As with predicting the tax liability associated with a particular tax event, embodiments of the present invention that predict the user's overall tax liability at an intermediate time in the year rely on the above-listed user information, including prior, known user information, and predicted user information. Similarly, a probability of the accuracy of the prediction can be provided.

Figure 5:
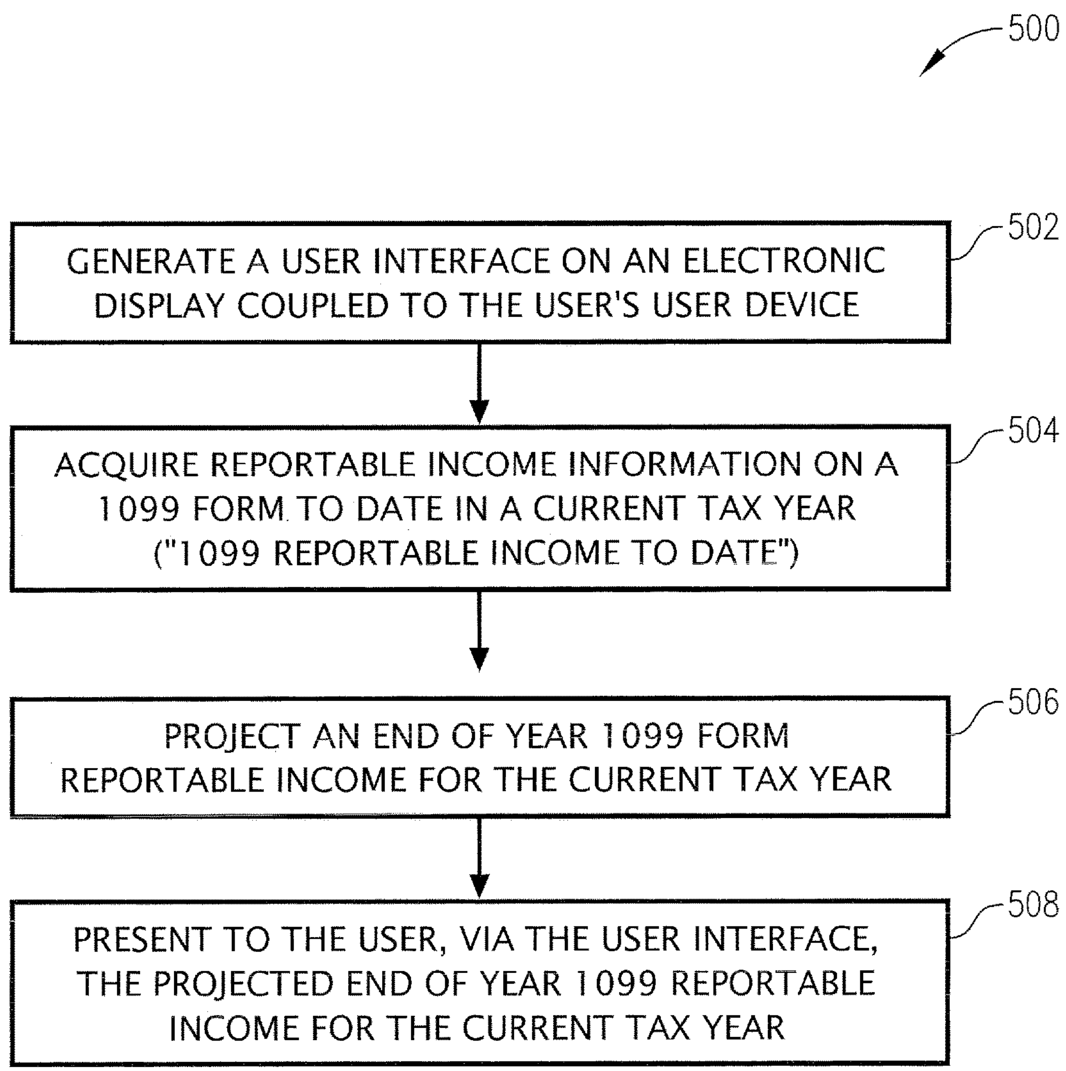
FIG. 5 is a flow chart of a method for predicting the user's end of year 1099 reportable income for a current tax year.

As also previously described, the computer program may use a plurality of rules and thresholds to project a user's end of year 1099 reportable income. An exemplary method 500 of projecting an end of year 1099 form reportable income is illustrated in FIG. 5. Code segments for executing the method 500 may be included in the computer program, as described herein.

In step 502, a user interface is generated on an electronic display coupled to a user's user device. In the next step 504, reportable income information on a 1099 form to date in a current tax year is acquired from a 1099 income information source. As was previously discussed, the 1099 income information source may include financial institutions, financial service providers, financial management software, the user or the user's tax preparer, or other similar sources. In step 506, an end of year 1099 form reportable income for the current tax year is projected based on the 1099 reportable income to date and also on 1099 projection information. As was also previously discussed, the 1099 projection information may include, for instance, 1099 reportable income for one or more prior tax years, a remaining amount of time left in the current tax year, stock market fluctuations, interest rate fluctuations, or other similar economic indicators. Finally, in step 508, the projected end of year 1099 reportable income for the current tax year is presented to the user via the user interface of the user's user device.

As with predicting a probability of the accuracy of projecting the user's tax liability associated with a particular tax event, embodiments of the present invention may predict an accuracy probability for the projected end of year 1099 reportable income. Such accuracy probability may be based at least in part on 1099 accuracy probability information as was previously discussed.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for predicting an impact of income reported on a 1099 form on a user's tax liability, the system comprising:

a deduction data store having stored thereon information indicative of a plurality of tax deductions and a plurality of tax credits;

a non-transitory computer readable storage medium having a computer program stored thereon for predicting an impact of income reported on a 1099 form on a user's tax liability; and a processing element associated with the computer readable storage medium for executing the computer program, wherein the execution of the computer program performs the following steps:

acquiring known user information related to the user and the user's taxes, wherein the known user information includes at least some information for a current tax year to date;

predicting at least some user information related to the user and the user's taxes for a remainder of the current tax year based at least partially on the known user information, wherein the step of predicting at least some user information is performed at an intermediate time in the current tax year and prior to termination of the current tax year, such that the predicted user information is for said remainder of the current tax year;

acquiring reportable income on a 1099 form to date in the current tax year ("1099 reportable income to date");

projecting, in said intermediate time in the current tax year, an end of year 1099 reportable income for the current tax year based at least partially on the 1099 reportable income to date;

comparing, in said intermediate time in the current tax year, the known user information, the predicted user information, and the projected end of year 1099 reportable income with requirements for at least one of tax deductions and tax credits offered by a taxing authority;

accessing the deductions data store to identify tax deductions or tax credits having requirements related to the known user information, the predicted user information, and the projected end of year 1099 reportable income and identifying, in said intermediate time in the current tax year, said deductions or credits;

predicting, in said intermediate time in the current tax year, an impact of the projected end of year 1099 reportable income on the user's tax liability for the current tax year based on the known user information, the predicted user information, the projected end of year 1099 reportable income, and the requirements for at least one of tax deductions and tax credits for the current tax year;

predicting, in said intermediate time in the current tax year, an accuracy probability for the projected end of year 1099 reportable income based at least partially on 1099 accuracy probability information;

wherein the 1099 accuracy probability information is indicative of at least one of a type of 1099 reportable income, a frequency of receipt or payment of the 1099 reportable income, a particular time of a tax period when the 1099 reportable income is received or paid, and a 1099 reportable income for one or more prior tax years;

presenting to the user, via a user interface, the impact and the accuracy probability for the projected end of year 1099 reportable income; and presenting to the user, via the user interface, a recommendation to the user to perform an action affecting the end of year 1099 reportable income to reduce the user's tax liability.

2. The system of claim 1, wherein the end of year 1099 reportable income is further projected based on 1099 projection information comprised of one or more of the following: a 1099 reportable income for one or more prior tax years, a remaining amount of time left in the current tax year, stock market fluctuation trends and projections, and interest rate fluctuation trends and projections.

3. The system of claim 1, further including the step of calculating an estimated amount by which the credit or deduction will reduce the user's tax liability based on the known user information, the predicted user information, the predicted end of year 1099 reportable income, and the requirements for the deduction or credit.

4. The system of claim 1, further including the step of providing a 1099 report of the 1099 reportable income to date and the projected end of year 1099 reportable income.

5. The system of claim 4, wherein the 1099 report includes a total summary of the 1099 reportable income to date and the projected end of year 1099 reportable income.

6. The system of claim 4, wherein the 1099 report includes individual summaries of the 1099 reportable income to date and the projected end of year 1099 reportable income for each type of 1099 form from which the 1099 reportable income is based.

7. The system of claim 1, wherein said known user information includes a plurality of tags, wherein each of the plurality of tags is indicative of a category corresponding to a purchase or tax event related to the taxpayer.

8. A system for predicting an impact of income reported on a 1099 form on a user's tax liability, the system comprising:

a deduction data store having stored thereon information indicative of a plurality of tax deductions and a plurality of credits;

a non-transitory computer readable storage medium with a computer program stored thereon, for predicting an impact of income reported on a 1099 form on a user's tax liability, with the computer program performing the steps of:

acquiring known user information related to the user and the user's taxes, wherein the known user information includes at least some information for a current tax year to date;

predicting at least some user information related to the user and the user's taxes for a remainder of the current tax year based at least partially on the known user information, wherein the step of predicting at least some user information is performed at an intermediate time in the current tax year and prior to termination of the current tax year, such that the predicted user information is for said remainder of the current tax year;

acquiring, in said intermediate time in the current tax year, reportable income on a 1099 form to date in the current tax year ("1099 reportable income to date");

comparing, in said intermediate time in the current tax year, the known user information, the predicted user information, and the 1099 reportable income to date with requirements for at least one of tax deductions and tax credits offered by a taxing authority;

accessing the deduction data store to identify deductions or credits having requirements related to the known user information, the predicted user information, and the 1099 reportable income to date and identifying, in said intermediate time in the current tax year, said deductions or credits;

predicting, in said intermediate time in the current tax year, the impact of the 1099 reportable income to date on the user's tax liability based on the known user information, the predicted user information, and the 1099 reportable income to date, and the requirements for at least one of tax deductions and tax credits for the current tax year; and predicting, in said intermediate time in the current tax year, an accuracy probability that the taxpayer will qualify for the deductions or credits based at least partially on a set of accuracy probability information, wherein the set of accuracy probability information is indicative of at least one of a type of deduction or credit, known tax information related to the taxpayer for one or more prior tax years, previous deductions and credits taken by the taxpayer, a particular time of a tax period when the 1099 reportable income is received or paid, and a 1099 reportable income for one or more prior tax years; and a user device communicatively linked to said computer readable medium, having a computer program thereon for receiving information from and presenting information to the user, wherein the computer program performs the steps of:

receiving the known user information related to the user and the user's taxes;

presenting to the user, via a user interface, the impact and the accuracy probability for the impact of the deductions and credits on the user's tax liability; and presenting to the user, via the user interface, a recommendation to perform an action affecting the end of year 1099 reportable income to reduce the user's tax liability.

9. The system of claim 8, wherein the user device is a smart phone.

10. The system of claim 8, further including the step of calculating an estimated amount by which the credit or deduction will reduce the user's tax liability based on the known user information, the predicted user information, the end of year 1099 reportable income, and the requirements for the deduction or credit.

11. The system of claim 8, further including the step of providing a 1099 report of the 1099 reportable income to date.

12. The system of claim 8, wherein said known user information includes a plurality of tags, wherein each of the plurality of tags is indicative of a category corresponding to a purchase or tax event related to the taxpayer.

13. A non-transitory computer readable storage medium with a computer program stored thereon, for projecting an end of year 1099 form reportable income for a user, with the computer program performing the steps of:

providing to the user a set of computer-executable instructions that when executed by a user's user device, generate a user interface displayable on an electronic display coupled to the user's user device;

acquiring, from a 1099 income information source, reportable income information on a 1099 form to date in a current tax year ("1099 reportable income to date");

projecting an end of year 1099 form reportable income for the current tax year based at least partially on the 1099 reportable income to date and 1099 projection information, wherein the step of projecting an end of year 1099 form reportable income is performed at an intermediate time in the current tax year and prior to the termination of the current tax year, such that the projected end of year 1099 form reportable income is for a remainder of the current tax year;

presenting to the user, via the user interface, the projected end of year 1099 reportable income for the current tax year;

predicting, in said intermediate time in the current tax year, an accuracy probability for the projected end of year 1099 reportable income based at least partially on 1099 accuracy probability information, wherein the 1099 accuracy probability information is indicative of at least one of a type of 1099 reportable income, a frequency of receipt or payment of the 1099 reportable income, a particular time of a tax period when the 1099 reportable income is received or paid, and a 1099 reportable income for one or more prior tax years;

presenting to the user, via the user interface, the impact and the accuracy probability for the projected end of year 1099 reportable income; and presenting to the user, via the user interface, a recommendation to perform an action affecting the end of year 1099 reportable income to reduce the user's tax liability.

14. The computer readable storage medium of claim 13, wherein the 1099 reportable income to date is comprised of one or more of the following types of 1099 reportable incomes: interest, dividends, payments, proceeds, and distributions.

15. The computer readable storage medium server of claim 13, wherein the 1099 income information source includes one or more of the following:

a financial institution, a financial services provider, the user, and financial management software.

16. The computer readable storage medium of claim 13, wherein the 1099 projection information is comprised of one or more of the following: a 1099 reportable income for one or more prior tax years, a remaining amount of time left in the current tax year, stock market fluctuation trends and projections, and interest rate fluctuations trends and projections.

17. The computer readable storage medium of claim 13, wherein the 1099 accuracy probability information is comprised of one or more of the following: a 1099 reportable income for one or more prior tax years, a remaining amount of time left in the current tax year, and a type of income of the projected end of year 1099 form reportable income.

18. The computer readable storage medium of claim 17, wherein the type of income of the projected end of year 1099 form reportable income is an individual stock distribution, and the 1099 accuracy probability information considers fluctuation trends and projections related to a stock market price of the individual stock.

19. The computer readable storage medium of claim 13, further including the step of providing a 1099 report of the 1099 reportable income to date and the projected end of year 1099 reportable income.

* * * * *